(12) United States Patent
Herrmann et al.

(10) Patent No.: US 8,731,692 B2
(45) Date of Patent: May 20, 2014

(54) METHOD AND DEVICE FOR AUTOMATICALLY INTEGRATING SENSOR DEVICES IN A CENTRAL CONTROLLER

(75) Inventors: Marius Michael Herrmann, Rosenheim (DE); Xiang Zhang, Dortmund (DE); Dag Ewering, Dortmund (DE); Thomas Nendza, Neuwied (DE); Matthias Weber, Dortmund (DE)

(73) Assignee: KHS GmbH, Dortmund (DE)

( * ) Notice: Subject to any disclaimer, the term of this patent is extended or adjusted under 35 U.S.C. 154(b) by 262 days.

(21) Appl. No.: 13/133,174

(22) PCT Filed: Dec. 18, 2009

(86) PCT No.: PCT/EP2009/009113
§ 371 (c)(1),
(2), (4) Date: Jun. 7, 2011

(87) PCT Pub. No.: WO2010/099811
PCT Pub. Date: Sep. 10, 2010

(65) Prior Publication Data
US 2011/0245936 A1    Oct. 6, 2011

(30) Foreign Application Priority Data

Mar. 2, 2009   (DE) .................. 10 2009 012 832

(51) Int. Cl.
| G05B 19/42  | (2006.01) |
| G06F 15/18  | (2006.01) |
| G06F 15/16  | (2006.01) |
| G06F 15/173 | (2006.01) |
| G06F 3/00   | (2006.01) |

(52) U.S. Cl.
USPC ............... 700/86; 700/89; 706/28; 709/218; 709/219; 709/224; 710/8; 710/15

(58) Field of Classification Search
USPC ............... 700/86, 89; 706/26–28, 33, 34; 709/217, 218, 223, 224; 455/39, 68, 455/69, 73, 88; 710/110
See application file for complete search history.

(56) References Cited

U.S. PATENT DOCUMENTS

| 6,503,649 B1 * | 1/2003 | Czajkowski et al. ......... 429/430 |
| 6,735,630 B1 * | 5/2004 | Gelvin et al. ................. 709/224 |
| 7,831,283 B2 * | 11/2010 | Ogushi et al. ................. 455/574 |
| 2001/0056306 A1 | 12/2001 | Nakai et al. |
| 2005/0268012 A1 * | 12/2005 | Schaetzle et al. ............. 710/110 |
| 2009/0083465 A1 * | 3/2009 | Schaetzle et al. ............. 710/110 |

* cited by examiner

Primary Examiner — Crystal J Barnes-Bullock
(74) Attorney, Agent, or Firm — Occhiuti & Rohlicek LLP (57) ABSTRACT

The invention relates to a method for automatically modularly integrating sensor devices (16) in a central controller (11) of a network having at least one first server comprising at least one first communication module (12) and the central controller (11) for at least one part of the network. The method comprises at least the following steps: a.) determining the sensor devices (16) actually associated with the at least one first server by the at least one first communication module (12); b.) comparing the determined actual sensor devices (16a, 16b) to a quantity of detectable sensor devices defined in a detecting order and determining matching sensor devices (16a); c.) transmitting data associated with the matching sensor devices from the first communication module (12) to the central controller (11); d.) automatically integrating predefined control modules in the central controller (11) based on the transmitted data, wherein the predefined control modules (16a) are each associated with the data of the matching sensor devices. The invention further relates to a device for performing the method, and to a computer program having program code means for performing all the steps of the method.

13 Claims, 3 Drawing Sheets

Figure 3

METHOD AND DEVICE FOR AUTOMATICALLY INTEGRATING SENSOR DEVICES IN A CENTRAL CONTROLLER

CROSS-REFERENCE TO RELATED APPLICATIONS

This application is the National Stage of International Application No. PCT/EP2009/009113, filed on Dec. 18, 2009, which claims the priority of German Patent Application No. 10 2009 012 832.8, filed on Mar. 2, 2009. The contents of both applications are hereby incorporated by reference in their entirety.

FIELD OF DISCLOSURE

The present invention relates to a method and a device for automatically integrating sensor devices in a central controller, in particular for the automatic modular integration of sensor devices in a central controller of a network as well as a computer programme having programme code means for performing all the steps of the method.

BACKGROUND

Central controllers of networks in the sense of the description essentially concern all industrial systems in all conceivable fields of mechanical and plant engineering. In particular they encompass controllers of networks in manufacturing and production installations as well as in installations of special-purpose mechanical engineering such as for example packing or filling installations, in particular for bottling beverages.

The following sections deal by way of example only with monitoring systems of filling installations as industrial systems, whereby the monitoring systems in particular comprise every type of sensor device for monitoring states and sequences in the system that is to be monitored. The present method and present device can of course also be used for all other types of controllers and their components in the said industrial systems.

Industrial systems, in particular filling installations, are in general grouped in so-called production lines, with each production line manufacturing one particular end product. This can be a bottle filled with a particular beverage and having a special label affixed to it, for example.

Moreover a number of such production lines which are operated in parallel with one another can also be provided within an industrial system.

Each production line usually comprises a plurality of stations, with each station executing one particular operation or a plurality of operations on the way to manufacturing the end product. These steps may for example involve the arranging, washing, conveying, filling, sealing or labelling of bottles.

Each station usually exhibits a plurality of components which interact to execute the particular operation of the machine. In particular, the components of each station are controlled and monitored by a local processing unit such as a server for example. Components specially provided for monitoring the correct performance of the steps of the stations include inter alia the described sensor devices which can be executed for example as cameras, motion sensors, light barriers or other input/output devices and which monitor, for example, filling levels of bottles, a correct positioning of labels or the correct sealing of the bottles. The local processing units of an entire production line are generally controlled and monitored by a central processing unit. A plurality of production lines can of course also be assigned to one central processing unit.

According to the prior art, the local processing units or servers of the individual stations are specifically adapted and configured for the work and monitoring steps carried out at the station concerned. The consequence of this is that if changes are made to the components of the station, e.g. the sensor devices mentioned above, or if changes are made to their triggering, an individual adaptation must be made in the software of the local server or of an associated controller. If for example parameters have to be modified, sequences re-programmed or a new additional sensor device integrated into the station to fulfil new tasks, then a customised modification must be made to the controller or to the particular server of each of the affected stations individually. If the changes have to be made to a plurality of stations, then each of the associated local servers must be modified individually.

If a component which is no longer used is to be removed, then this component would also have to be laboriously dismantled manually from the controller. This unused component is therefore usually left in the controller and continues to be operated. This means that for example a camera or a light barrier continues to be triggered, only its output being ignored. The component is also usually left within a user interface belonging to the controller and is displayed there, with the result that the operator interface can become increasingly cluttered with unused components.

In both cases, a flexible adaptation for the integration and removal of components, in particular of sensor devices, in the controller is not possible. The customised adaptation of the individual local stations or their servers is also always very time-consuming. In particular, this precludes a short-term and temporary flexible adaptation and integration of selected components in a controller as might be necessary for example in the case of a short-term change of product to be produced on the production line. Consequently there is a need to provide a method for the flexible integration of components in a controller and in particular to facilitate an automatic integration of these components into a central controller of a corresponding industrial system.

SUMMARY

A method for the automatic modular integration of sensor devices in a central controller of a network according to claim 1, a device according to claim 11 and a computer programme product according to claim 13 are therefore provided.

Thus the method for the automatic modular integration of sensor devices in a central controller of a network having at least one first server which comprises at least one first communication module and the central controller for at least one part of the network, comprises at least the following steps:

a.) Determining the sensor devices actually associated with the at least one first server by the at least one first communication module, b.) Comparing the determined actual sensor devices with a plurality of detectable sensor devices defined in a detecting order and determining matching sensor devices, c.) Transmitting data associated with the matching sensor devices from the first communication module to the central controller, d.) Automatically integrating predefined control modules in the central controller based on the transmitted data, wherein the predefined control modules are each associated with the data of the matching sensor devices.

As has been stated above, the description is given purely by way of example for monitoring systems of production lines for filling installations. Consequently sensor devices are used as components of the different stations of the production lines. These sensor devices are provided to monitor and control the production line, in particular the corresponding stations. The sensor devices may for example comprise inter alia cameras, light barriers, motion sensors or other sensors or sensor devices suitable for performing monitoring tasks. It is however expressly pointed out that other components, in particular those for executing the process steps at the particular station of the production line, can equally be encompassed and integrated in a central controller with the aid of the method described.

The network comprises at least the first server, whereby the at least one first server of the network can receive from the central controller control commands for controlling sensor devices that are connected to or assigned to the first server. The central controller itself comprises a user interface for exchanging information with the user. Parameters and measured values in particular can be output over the user interface. Likewise a user can also input information and default values, in particular for parameters, for controlling the at least one server and the associated sensor device. The central controller is configured in such a way that it can be modularly expanded by the described method so that the central controller can be automatically adapted to the sensor devices assigned to the server, this adaptation being effected automatically without the need to manually re-programme the server or the central controller within the scope of the adaptation. To this end, as described above, the at least one first server is checked or scanned for assigned sensor devices by the first communication module, with information about the sensor devices that are actually connected to the server being collected by the first communication module. A comparison is then performed between the sensor devices just determined in the scan operation and a detecting order in which a plurality of desired sensor devices is defined.

Desired sensor devices are to be understood to be those sensor devices which are to be integrated into the central controller. Information about these desired sensor devices is stored in the detecting order for this purpose. A detecting order can generally be understood as an instruction to a communication module which (instruction) contains a task to be executed by the communication module and the information necessary for this. The detecting order may for example comprise an instruction to execute the scan operation and an instruction to compare a result of the scan operation with information—also stored in the detecting order—about the previously described desired sensor devices.

In this way it is possible by way of the detecting order to explicitly and in advance define which sensor devices are to be detected on this server. If sensor devices that are not defined in the detecting order are assigned to the server, these sensor devices are henceforth disregarded. All matching sensor devices on the server on the other hand are determined by the executed comparison and the information about the matching sensor devices is made available in the form of data. These data are at the least executed in such a way that they can be used for an identification of the sensor devices and so are assigned to the latter. Therefore these assigned data provide an overview of all matching sensor devices on the corresponding server and may for example contain a listing thereof.

The assigned data are subsequently forwarded by the communication module to the central controller or transmitted to the latter. Based on these data the central controller can accordingly add predefined control modules to the central controller and integrate them automatically into the central controller.

Control modules for the purpose of this description are to be understood as for example routines or also subroutines which can be modularly integrated into, or also removed from, a basic routine of the central controller. By integrating such control modules, the controller can be expanded by the functionalities defined in these modules. Thus integrating a control module of the central controller which (control module) is assigned to a sensor device makes it possible for example to trigger the particular sensor device or to provide the corresponding necessary parameters in the central controller. Parameters that are relevant for monitoring this sensor device must also be integrated into the user interface of the central controller. This function too can be defined for example in the corresponding control module.

The predefined control modules can for example be stored in a library from where they can be retrieved. This means that the central controller can be flexibly and modularly adapted to the instantaneous configuration of the network by reference to the data about the sensor devices actually connected to the first server. In particular, only those predefined control modules for which an actual sensor device is present and which was also defined in the detecting order are integrated into the central controller. Sensor devices that are not defined remain connected to the first server but are ignored in the central controller. This allows the central controller to be kept small and uncluttered and in particular its user interface to be optimised regarding these aspects.

According to another embodiment, the method also comprises the following step for triggering the connected sensor devices:

e.) Automatic integration of at least one defined detecting module in the server, with the integrated defined detecting module being connected by communication technology to the first communication module and to at least one sensor device assigned to the server for the purpose of reciprocal data interchange.

An interface between a communication module and the sensor device connected to the associated server is understood to be a detecting module for the purpose of the present description. In this detecting module it is possible for example to define tasks of the sensor device and to configure the detecting module as a control programme for triggering the sensor device concerned. Parameters can also be defined as well as the control programme. Accordingly the detecting module can for example be responsible for controlling a camera and comprise parameters for triggering said camera. As is explained hereinafter in greater detail, the detecting module may also be configured for the forwarding or also for a processing of the signals provided by the sensor device concerned. This means that if a camera is connected, the detecting module can either merely forward the camera's images or can also adapt and/or evaluate them. If for example the camera is used to monitor whether a label is correctly positioned or oriented on a bottle, then an algorithm for evaluating the created image, and with whose help the position of the label is determined, can be integrated in the corresponding detecting module. Thus the detecting module can be configured to autonomously execute a processing of the image and a subsequent evaluation. In the case described here, the detecting module therefore receives an image from the camera and after a processing and evaluation only outputs the desired result of whether the label is correctly positioned. The result is subsequently output to the communication module. Conversely however the detecting module can also receive data and information from the communication module and process it and/or forward it to the sensor device.

As well as the afore mentioned detection and integration of sensor devices into the network, a module for exchanging data between at least one corresponding sensor device and the associated communication module can therefore also be facilitated with this step of integrating a detecting module.

The sensor devices which are used are not as a rule individually configured unique items but devices with a multiplicity of uses. This makes it possible to adapt the detecting module selectively for the particular type of the at least one sensor device and so that the detecting module can be adopted for a further use of a second sensor device of identical construction.

This means that the detecting module must be adapted in a universal manner to the at least one corresponding sensor device and/or to its type, and that a defined interface for communicating with the communication module must be provided. Consequently only one predefined detecting module need be provided for each different type of sensor device. This can be effected previously, with the result that a particular sensor device need not be manually integrated or installed locally at the server concerned.

The predefined detecting modules for each type of sensor device can for example be provided in a library from where they can be retrieved as required. A manual specific configuration of the particular server can therefore be dispensed with and is replaced by the automatic integration of the detecting module concerned. This means that the communication module can also be universally constructed because it does not have to be adapted to the different sensor devices. Unlike the detecting modules, the particular communication modules of the respective servers are already pre-installed on the latter, and are not normally modified any further when sensor devices are integrated. Therefore an adaptation of the network or of the underlying device is effected exclusively by the detecting modules. If new sensor devices are to be integrated or if already integrated sensor devices are to be incorporated into the central controller, then only the corresponding detecting module need be integrated and if necessary an existing detecting module be replaced.

This simplification is achieved by a separation between the communication module and the detecting module. A uniform interface between both modules can moreover be provided for the uniform handling and simple modular interchangeability of the detecting modules. As described in greater detail below, the predefined detecting module can of course also be flexibly created from predefined submodules according to a kit principle. The detecting module itself is not predefined and stored in this case. Only the individual submodules are predefined and stored in this case, and can be assembled individually as required to create the desired detecting module.

According to a further embodiment, the network also comprises a plurality of second servers. In this instance, a second communication module being connected to the first communication module of the first servers by communication technology is assigned to each of the second servers out of the plurality of second servers, with steps a.) and b.) being executed by and in respect of at least one second server out of the plurality of second servers instead of the at least one first server, and with the method also comprising the following further steps:

a'.) Sending a defined detecting order from the first communication module to the second communication module of the at least one second server, a plurality of detectable sensor devices being defined in the defined detecting order, c'.) Sending of data assigned to the matching sensor devices from the second communication module of the at least one second server to the first communication module, step a'.) being executed before step a.) and step c'.) before step c.).

According to this described embodiment, further so-called second servers are provided in addition to the first server mentioned above. However the central controller is still assigned to the first server, so that the latter assumes a higher-level 'master' function within the network, while each of the second servers can also be referred to as 'slave'. In production lines, the servers of the individual stations in particular can constitute the slaves or the second servers, and a control processor can be configured as first server or master. The particular communication-technology connection of the second servers to the first server allows the already explained detecting order to be sent from the first server to one or a plurality of the second servers. In this way, the detecting order can be entered centrally in the first server and distributed to the respective second servers. In the second servers, this detecting order can be processed similarly to the above description of the method steps in relation to the first server. This means also that the second communication module concerned scans the respective second server for sensor devices assigned to said second server, and that a comparison of the determined actual sensor devices with the sensor devices defined in the detecting order is carried out. Data which result from this comparison and which are associated with the matching sensor devices are then sent from the second communication module of at least one of the second servers to the first communication module of the first server. From there—as also already described above in relation to the first server—they are forwarded to the central controller so that an integration of the corresponding predefined control modules into the central controller can take place. According to this embodiment it is possible to simultaneously send a multiplicity of detecting orders to a multiplicity of second servers. In this process, one uniform detecting order can be sent for all servers or an individually adapted detecting order can be sent for each individual second server. From the data returned by the second servers, the first server is afforded an overview of the sensor devices arranged on the second servers concerned.

The method may also comprise the following steps for triggering the installed sensor devices:

f.) Sending of at least one defined detecting module by the first communication module to the second communication module of the at least one second server and g.) Automatic integrating of the at least one defined detecting module in the at least one second server, wherein the integrated defined detecting module for reciprocal data interchange is connected by communication technology to the second communication module and to at least one of the sensor devices assigned to at least one second server.

In this way a detecting module can also be sent via the respective communication modules from the first server to at least one second server. Here, similarly to the previous description in regard to the first server, the detecting module is also integrated and so establishes communication between the second communication module and the sensor device. This makes it possible to provide the detecting modules centrally on the first server in addition to the detecting orders, and to distribute them via the network to the second servers without the need for manual intervention on the second server concerned.

Moreover the method can also comprise a forwarding by the detecting module of data interchanged between the at least one sensor device and the communication module.

The method can also comprise a processing of the data by the detecting module.

As already comprehensively explained above, the described communication—by way of the respective detecting module—between the first or second communication module and the associated sensor device on the first server or on one of the second servers respectively can only comprise a pure forwarding of data, with the data themselves remaining unaltered. Alternatively, as also described above, as well as a pure forwarding, a processing of the data can also be carried out by the detecting module concerned, with for example a change of the data format of the data or even an evaluation of the data transmitted by the sensor device being carried out.

According to another embodiment, the detecting module is automatically adaptable. The detecting module can also be adapted on the basis of the assigned data.

As already briefly presented, the possibility of adapting the detecting module can be provided for example for a case in which a plurality of sensor devices are to be coupled to a single detecting module. A modular adaptation can be provided for this too, so that the detecting module is put together from universally prepared and preconfigured modules according to a kit principle. This means that an individually adapted detecting module can be provided from universal submodules which are prepared for the type of sensor device concerned. It is possible to use the data for the matching sensor devices, for example, as a criterion for a selection of the predefined submodules. These data provide information on which sensor devices are arranged on, or assigned to, which server. The detecting module that is to be created for that server is accordingly adapted by selecting the corresponding universal submodules which are preconfigured for the local sensor devices.

If therefore two types of sensor device, such as a camera and a light barrier for example, are to be connected to a detecting module, the detecting module must be configured so as to be able to communicate with both elements. This means that both a submodule predefined for the camera and a submodule predefined for the light barrier must be modularly combined with one another to form the desired detecting module. As well as each of the two type-specific submodules, a base module can also be integrated which provides universal functionalities of the detecting module which is [sic] not dependent on the types of connected sensor devices. This base module can for example define an interface with the communication modules of the servers which (interface) can be provided in every detecting module. It should again be stressed in this regard that the universal submodules can be stored ready-predefined for example in a library. An integration to form a detecting module can therefore be effected fully automatically according to predefined specifications and using the above mentioned data.

The submodules for creating the detecting module can define subtasks of the detecting module. This means that the submodules comprise for example algorithms for an object detection or colour detection. If new and/or different objects are to be detectable, then the corresponding submodule is exchanged for a submodule with a correspondingly adapted algorithm and a new detecting module is created on this basis. The latter can then be integrated as described into the server concerned where it replaces an existing detecting module. This offers the advantage that only new submodules are created and integrated instead of the whole detecting module having to be reconfigured. In this way it is also possible to adapt the detecting modules rapidly and flexibly to new requirements without integrating a large number of submodules which have to take account of all possible expansions and functions. Consequently only the submodules which will also actually be used are integrated. In this way it is possible to keep the size of the detecting module small and reduce the requirements on the servers.

According to a further embodiment, an installation controller that is connected to the controller by communication technology can be automatically adaptable. The installation controller can also be adapted on the basis of the assigned data.

According to this, the installation controller, such as for example a PLC controller of a production line, can also be flexibly modified, and a modular adaptation provided for this purpose. This means that the installation controller can be put together—again on the kit principle—from universally prepared and preconfigured modules. In this way, further functional modules can be added to, for example, a basic functionality of the installation controller. If for example a sensor device for monitoring the labelling of bottles is added to the monitoring system of the production line or to the latter's central controller, then a corresponding ejector in the production line must also be activated, i.e. integrated into the system which rejects the faulty bottles. There is consequently a need to upgrade the installation controller to control the ejector. Here again, the central controller can provide the data for the matching sensor devices for example, or other data about a configuration of the installation, as criteria for the choice of predefined functional modules, such that the installation controller can be flexibly and automatically adapted in this way. This means that the installation controller can be expanded for example on the basis of data of the central controller. In the example of the ejector for example the installation controller can be informed on the basis of this data that a sensor device for monitoring the labels has been integrated into the central controller and that the ejector must therefore be integrated into the installation controller. It is therefore possible to flexibly adapt the controller of the installation according to the products to be produced on this product line and yet to keep the installation controller as small as possible because only the functional modules that are relevant and used are integrated at the same time. Unused functional modules need not be included or they can be removed from the installation controller accordingly.

As set forth above, with the help of the described method it is possible, via the central first server, to change the detecting modules on the respective second servers by replacing them with new modified detecting modules. In this way a so-called update functionality which allows a remotely controlled change of a particular server configuration without personnel having to intervene in the second server concerned, is provided. In this way it is also possible for sensor devices that are not previously used but that are connected to the server to be incorporated into the central controller by simple replacement of the associated detecting modules. Conversely a detecting module that is no longer used can be removed from the central controller in this way. This is advisable for example when the product to be produced is (temporarily) changed on the associated production line. By replacing the detecting modules therefore it is possible to respond flexibly to new requirements of the products that are currently to be produced, and to integrate the correspondingly desired sensor devices into the central controller. Because this changeover can be performed centrally and quickly, an easy changeover of the production lines is possible.

It goes without saying that the second servers cannot only be assigned to a single production line. The second servers of a plurality of production lines can also be connected with a single first server so that the first server triggers a plurality of production lines simultaneously. In this way, a temporary minimal utilisation of the first server of a first installation can be used to control other installations and so save costs for additional servers, in particular for the relatively expensive central controller.

A device for carrying out the method described above is also provided, said device comprising at least one network with at least one first server which exhibits one first communication module and one central controller for at least one part of the network, with the first communication module and the central controller being configured to execute the method described above.

The device may moreover be embodied in such a way that the network also comprises a plurality of second servers, with each of the second servers being assigned—from the plurality of second servers—a second communication module that is connected to the first communication module by communication technology.

A computer programme having program code means is also provided to execute all steps of the described method when the computer programme is run on a computer or a corresponding processing unit. This includes in particular an industrial system or a device according to the above description.

The computer programme can be stored on a computer-readable data medium.

The present description also encompasses a computer programme product having program code means stored on a computer-readable data medium and which is configured for executing all steps of the described method when the computer programme is run on a computer or a corresponding processing unit.

Further advantages and embodiments of the invention are indicated in the description and the attached drawing.

It goes without saying that the characteristics set out above and still to be explained below can be used not only in the indicated combination as the cased may be but also in other combinations or in isolation without departing from the scope of the present invention.

The invention is shown schematically in the drawings on the basis of one embodiment and is described below in detail by reference to the drawings.

DETAILED DESCRIPTION

Figure 1:
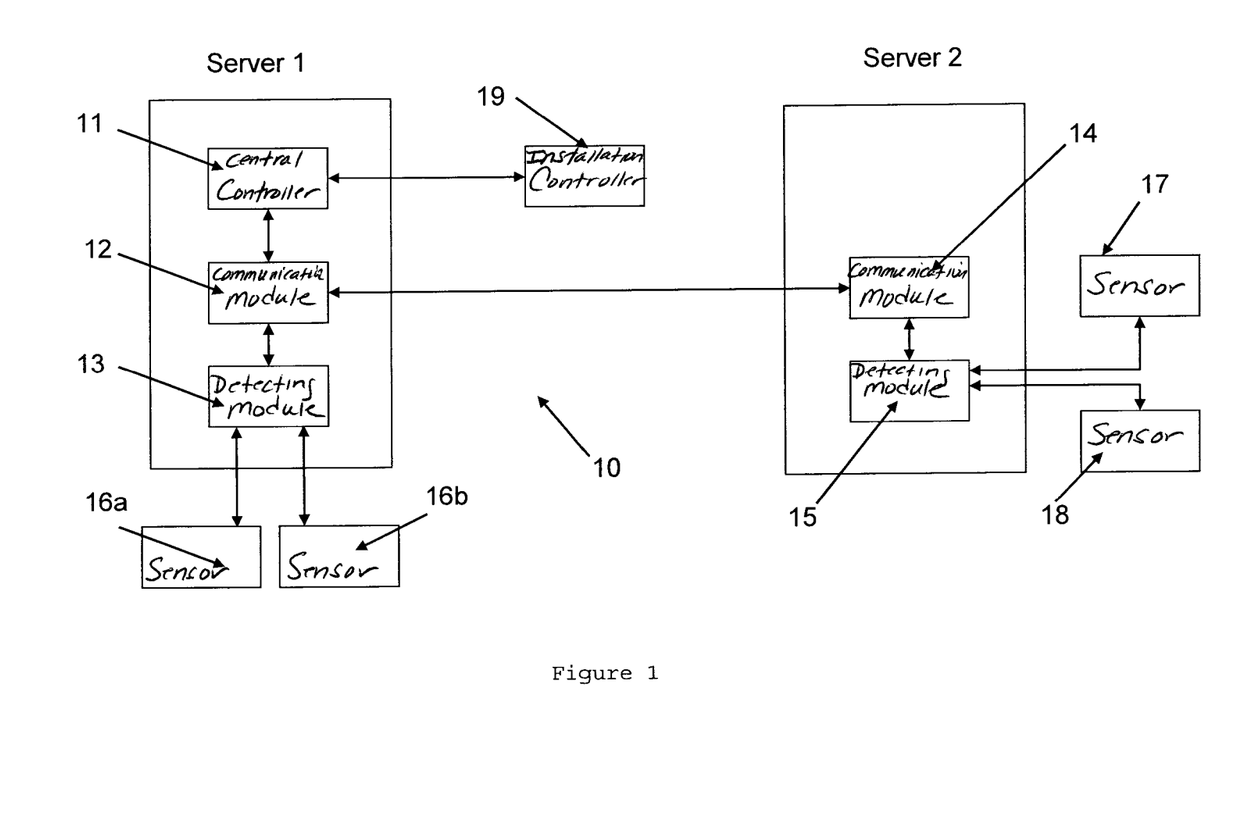
FIG. 1 shows a schematic representation of a device for carrying out a method according to the description.

FIG. 1 shows the schematic representation of a device 10 for carrying out an embodiment of a method according to the present description. According to this, device 10 comprises at least one network with a server 1 and a server 2. Server 1 comprises a central controller 11, a first communication module 12 and a first detecting module 13. Server 2 exhibits a second communication module 14 and a second detecting module 15. Sensor devices 16a and 16b can be integrated into central controller 11 by way of the following method. The first communication module 12 of server 1 determines sensor devices 16a and 16b assigned to server 1. An assignment can be effected as a communications connection between the elements, for example. In this way, first communication module 12 obtains an overview of sensor devices 16a and 16b available at server 1. These available sensor devices 16a and 16b are compared with a detecting order. Said detecting order defines a plurality of detectable sensor devices that are to be integrated into the central controller. This can be provided for example in the form of an overview of all proposed sensor devices, e.g. only sensor device 16a. Alternatively the overview may only contain those types of sensor devices that are to be detected on the server concerned, in this case server 1. Consequently it could be defined in the detecting order that only cameras and light barriers should be determined. This means that a different sensor device 16b which is not to be detected, such as a temperature sensor for example, can also be connected to the server. It will remain unused and is not integrated into central controller 11. It therefore does not occur there in an operator interface. In the example described, the comparison therefore provides an overview of that sensor device 16a which is both connected with and/or assigned to the server concerned, and defined in the detecting order. This overview of matching sensor device 16a contains data associated with matching sensor device 16a. In a further step, these data are sent to central controller 11. On the basis of these data, central controller 11 can retrieve from a library of predefined control modules (not shown) those control modules that are assigned to the integrated data, and integrate said control modules in the central controller. Modular subroutines for example can be described in general as control modules. These are assigned to certain sensor devices and define certain functions for controlling the sensor device concerned. The control modules can be integrated modularly in the central controller and expand it by the addition of the functions concerned. In the instance described, this means that the control modules for associated sensor device 16a are predefined and matched to it. In this way, corresponding sensor device 16a can be integrated in central controller 11 for triggering.

Moreover, from the overview—created by the communication module—of matching sensor device 16a on server 1, is it possible to create detecting module 13 which is preconfigured for detected sensor device 16a and coupled for data transmission between communication module 12 and sensor device 16a. In this respect, detecting module 13 assumes the task of forwarding data between communication module 12 and sensor device 16a. Detecting module 13 can however also be used to control sensor device 16a and to process data provided by sensor device 16a. If sensor device 16a is configured as a camera for monitoring a filling level of a bottle for example, then it supplies an image to detecting module 13. The latter evaluates the image by reference to parameters and algorithms stored in detecting module 13 and forwards the result to communication module 12.

According to FIG. 1, first communication module 12 of server 1 is connected to second communication module 14 of server 2 by communication technology. If sensor devices 17, 18 that are coupled to server 2 are now to be integrated in central controller 11 of the network, this requires further steps in addition to those previously described in reference to server 1. First of all, first communication module 12 sends a detecting order to second communication module 14. Similarly to the described determination and comparison step, the latter determines sensor devices 17, 18 assigned to server 2 and compares them with the sensor devices defined in the detecting order. The data obtained from the comparison are then sent from second communication module 14 to first communication module 12. This is followed by the previously described step of sending the data from first communication module 12 to central controller 11 and by the step of the automatic integration of the predefined control modules in central controller 11 which (predefined control modules) can for example as already described be stored in a library from where they are retrieved by central controller 11.

Figure 2:
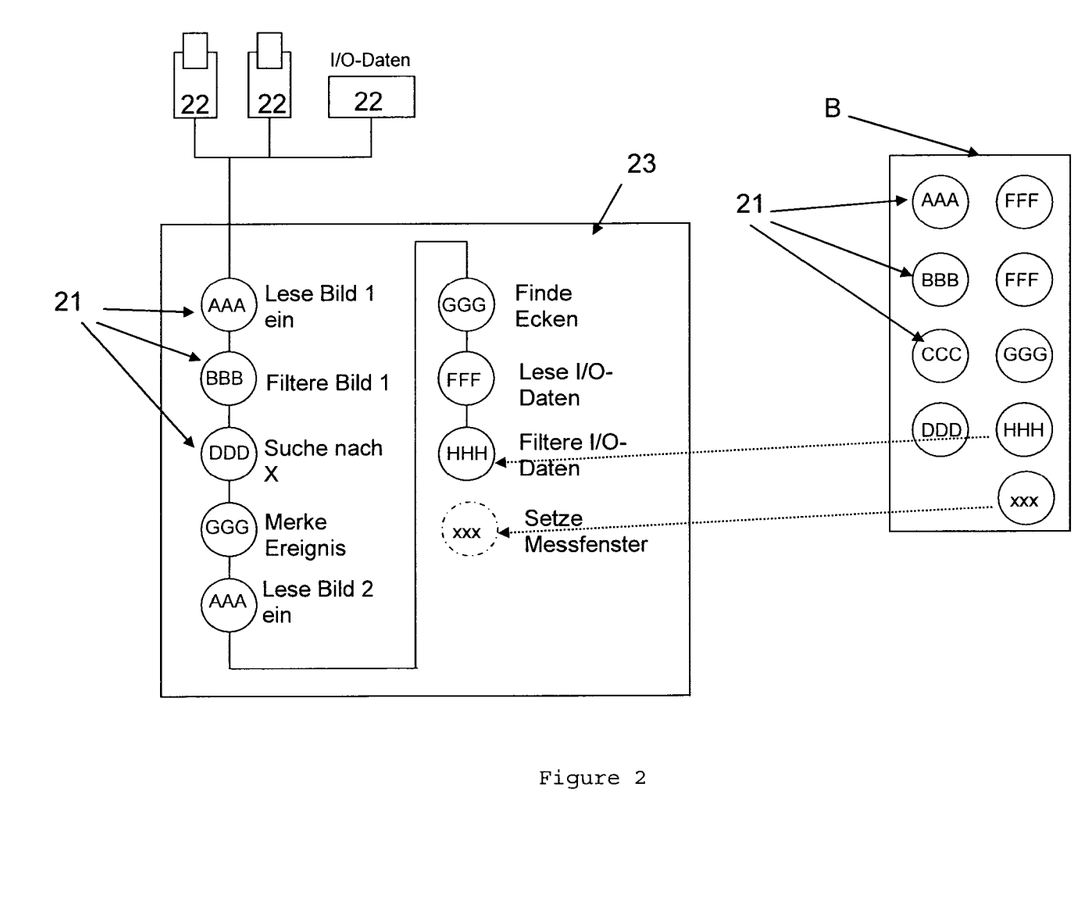
FIG. 2 shows a schematic representation for the flexible modular creation of a detecting module.

The integration of a second detecting module 15 too proceeds similarly to the description given in relation to server 1, the sole addition being an initial sending of second detecting module 15 by first communication module 12 to second communication module 14. The corresponding integration in server 2 is then effected. Second detecting module 15 can previously be modularly created on server 1 for server 2 on the basis of the information about sensor devices 17, 18 that are connected to server 2. For this, universally predefined submodules for example, which in isolation are specifically adapted to the operation of the individual sensor devices, can be combined to form second detecting module 15. FIG. 2 gives a detailed representation of the creation of the detecting module. A second detecting module 15 that is specially customised and adapted for server 2 can be created from universally predefined submodules in this way. First detecting module 13 can of course also be created modularly from submodules.

Central controller 11 can moreover be connected by communication technology with an installation controller 19 such as for example a so-called programmable logic controller PLC, and can exchange data with it for mutual coordination.

FIG. 2 shows a schematic view of the modular creation of a possible detecting module 23. According to this, submodules 21 are stored in library B. Submodules 21 comprise instructions and parameters for controlling associated sensor devices 22 and for handling data provided by sensor devices 22. In the depicted embodiment, sensor devices 22 comprise only two cameras and an unspecified input/output device (I/O) for example. Submodules 21 are read out of library B and modularly integrated in detecting module 23. This offers the advantage that individual submodules 21 for expanding detecting module 23 can be simply added or just as easily removed or replaced by other submodules 21. This may be necessary if for example a further sensor device 22 is to be added or one of the existing sensor devices 22 is removed. In this case, associated submodules 21 can be deleted from detecting module 23 and the size of detecting module 23 kept as small as possible.

Figure 3:
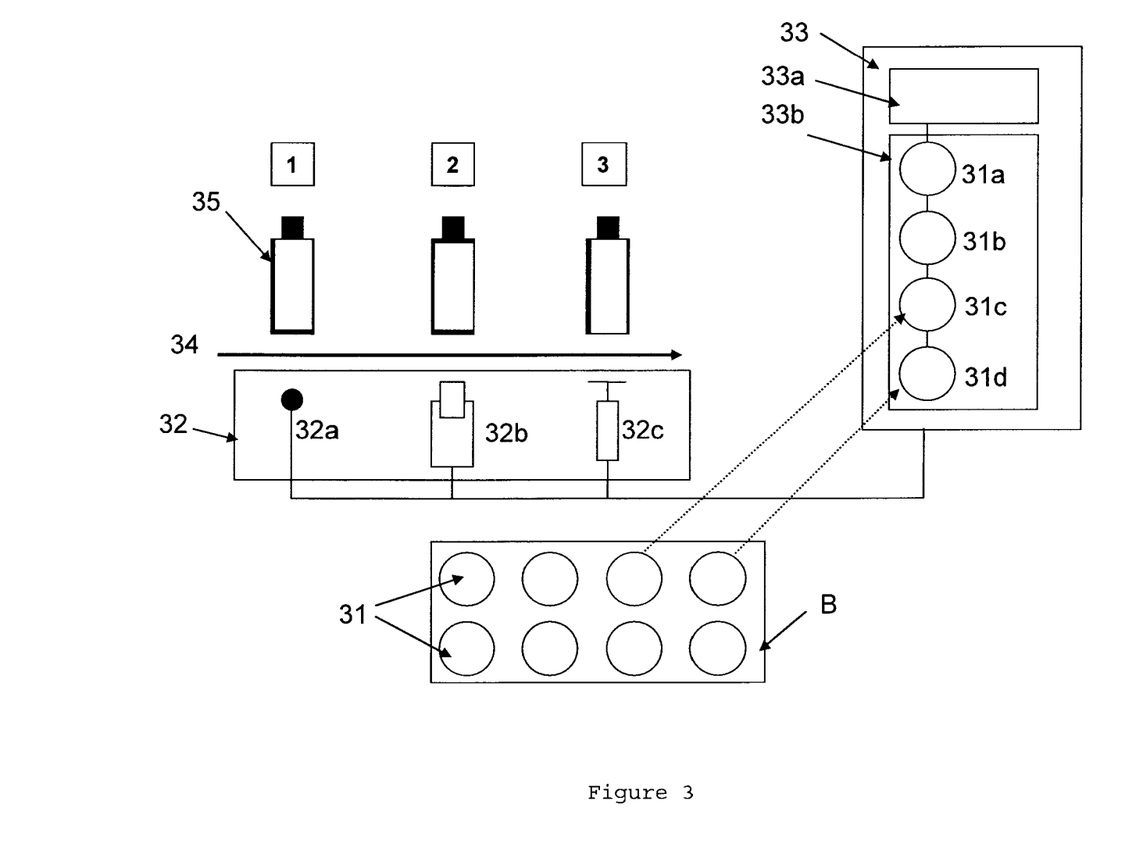
FIG. 3 shows a schematic representation for the flexible modular creation of an installation controller.

FIG. 3 shows a schematic representation of the flexible modular creation of an installation controller 33. According to this, installation controller 33 comprises a basic routine 33a with basic functions for controlling an associated production line 34 of the installation. A flexible modularly structured controller part 33b can also be provided to process special tasks. This is made up according to a kit principle of function modules 31 which in order to create controller part 33b and installation controller 33 are taken from a library B where they are already stored predefined and are individually combined for the application in hand. In the depicted example, a bottle at a position 1 is to pass through a light barrier 32a. The latter is connected to sensor device 32b that is configured as a camera, so that an image of a bottle 35 can be taken exactly at a position 2. The image is evaluated according to the description in FIG. 1 by a detecting module (not shown). Based on a result of this evaluation, it is then decided whether bottle 35 remains in production line 34 or is ejected at a position 3. In this regard, installation controller 33 receives corresponding information from a central controller (also not shown) of a monitoring system according to FIG. 1 that comprises sensor devices 32. Accordingly, flexible controller part 33b of installation controller 33 is made up, purely by way of example, from following function modules 31:

31a: Functional module for monitoring the light barrier
31b: Time-capture module for determining the bottle position after a defined period of time for the creation of the image and the accurately timed ejection of the bottle.
31c: Functional module for controlling the ejector.

The invention claimed is:

1. In a network having at least one first server, said at least one first server having at least one first communication module and a central controller for at least part of said network, a method for automatic modular integration of sensor devices in said central controller, said method comprising: a.) determining the sensor devices actually associated with the at least one first server by the at least one first communication module, b.) comparing the determined actual sensor devices with a plurality of detectable sensor devices defined in a detecting order and determining matching sensor devices, c.) sending data assigned to the matching sensor devices from the first communication module to the central controller, d.) automatically integrating predefined control modules in the central controller on the basis of the sent data, wherein the predefined control modules are each assigned to the data of the matching sensor devices.

2. The method of claim 1, further comprising triggering the integrated sensor devices by
   e.) automatically integrating at least one defined detecting module in the server,
   wherein, for the purpose of data interchange, the integrated defined detecting module is connected by communication technology with the first communication module and with at least one of the sensor devices assigned to the server.

3. The method of claim 2, further comprising forwarding, by the detecting module, data interchanged between the at least one sensor device and the communication module.

4. The method of claim 2, further comprising processing of the data by the detecting module.

5. The method of claim 2, wherein automatically integrating the detecting module comprises automatically integrating an automatically adaptable detecting module.

6. The method of claim 5, wherein the detecting module automatically adapts on the basis of the assigned data.

7. The method of claim 1, wherein the network further includes a plurality of second servers, with each of the second servers from the plurality of second servers being assigned a second communication module that is connected by communication technology with the first communication module, wherein steps a.) and b.) are executed by and in relation to at least one second server of the plurality of second servers in place of the at least one first server, said method further comprising: a'.) sending a defined detecting order from the first communication module to the second communication module of the at least one second server, a number of detectable sensor devices being defined in the defined detecting order, c'.) sending data assigned to the matching sensor devices from the second communication module of the at least one second server to the first communication module, wherein step a'.) is executed before step a.), and wherein step c'.) is executed before step c.).

8. The method of claim 7, further comprising triggering he integrated sensor devices by f.) sending at least one defined detecting module by the first communication module to the second communication module of the at least one second server and g.) automatically integrating the at least one defined detecting module in the at least one second server, wherein the integrated defined detecting module is connected for data interchange by communication technology with the second communication module and with at least one of the sensor devices assigned to the at least one second server.

9. The method of claim 1, further comprising connecting an automatically adaptable installation controller with the central controller by communication technology.

10. The method of claim 9, wherein the installation controller adapts on the basis of the assigned data.

11. An apparatus comprising: at least one network, at least one first server, a first communication module and central controller for at least one part of the network, wherein the first communication module and the central controller are configured to perform a method for automatic modular integration of sensor devices in said central controller, said method comprising: determining the sensor devices actually associated with the at least one first server by the at least one first communication module, comparing the determined actual sensor devices with a plurality of detectable sensor devices defined in a detecting order and determining matching sensor devices, sending data assigned to the matching sensor devices from the first communication module to the central controller, automatically integrating predefined control modules in the central controller on the basis of the sent data, wherein the predefined control modules are each assigned to the data of the matching sensor devices.

12. The apparatus of claim 11, wherein the network further comprises a plurality of second servers, with each of the second servers from the plurality of second servers being assigned a second communication module that is connected by communication technology with the first communication module.

13. A manufacture comprising a tangible computer-readable medium having encoded thereon software for execution of a method applicable to a network having at least one first server, said at least one first server having at least one first communication module and a central controller for at least part of said network, said encoded software including instructions for executing a method for automatic modular integration of sensor devices in said central controller, said instructions including instructions for causing a processing system to execute a method for automatic modular integration of sensor devices in said central controller, said method comprising: determining the sensor devices actually associated with the at least one first server by the at least one first communication module, comparing the determined actual sensor devices with a plurality of detectable sensor devices defined in a detecting order and determining matching sensor devices, sending data assigned to the matching sensor devices from the first communication module to the central controller, automatically integrating predefined control modules in the central controller on the basis of the sent data, wherein the predefined control modules are each assigned to the data of the matching sensor devices.

* * * * *